United States Patent
Chu et al.

(10) Patent No.: US 10,390,328 B2
(45) Date of Patent: *Aug. 20, 2019

(54) BEAMFORMING TRAINING IN ORTHOGONAL FREQUENCY DIVISION MULTIPLE ACCESS (OFDMA) COMMUNICATION SYSTEMS

(71) Applicant: Marvell World Trade Ltd., St. Michael (BB)

(72) Inventors: Liwen Chu, San Ramon, CA (US); Hongyuan Zhang, Fremont, CA (US); Lei Wang, San Diego, CA (US); Yakun Sun, Sunnyvale, CA (US); Jinjing Jiang, San Jose, CA (US); Hui-Ling Lou, Sunnyvale, CA (US)

(73) Assignee: Marvell World Trade Ltd., St. Michael (BB)

(*) Notice: Subject to any disclaimer, the term of this patent is extended or adjusted under 35 U.S.C. 154(b) by 232 days.

This patent is subject to a terminal disclaimer.

(21) Appl. No.: 15/144,543

(22) Filed: May 2, 2016

(65) Prior Publication Data
US 2016/0255606 A1 Sep. 1, 2016

Related U.S. Application Data

(63) Continuation-in-part of application No. 14/961,380, filed on Dec. 7, 2015.
(Continued)

(51) Int. Cl.
*H04W 72/00* (2009.01)
*H04L 5/00* (2006.01)
(Continued)

(52) U.S. Cl.
CPC .......... *H04W 72/005* (2013.01); *H04L 5/005* (2013.01); *H04L 5/0023* (2013.01);
(Continued)

(58) Field of Classification Search
CPC ... H04L 5/0007; H04L 5/0023; H04L 5/0037; H04L 5/005; H04L 5/0057;
(Continued)

(56) References Cited

U.S. PATENT DOCUMENTS

| 7,599,332 | B2 | 10/2009 | Zelst et al. |
| 7,742,390 | B2 | 6/2010 | Mujtaba |

(Continued)

OTHER PUBLICATIONS

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).
(Continued)

*Primary Examiner* — Kan Yuen (57) ABSTRACT

A beamforming training packet is transmitted from a first communication device to multiple second communication devices. A trigger frame is generated at the first communication device to trigger an uplink orthogonal frequency division multiple access (OFDMA) transmission of beamforming training feedback from at least some of the multiple second communication devices. After transmission of the beamforming training packet by the first communication device, the trigger frame is transmitted to the at least some of the multiple communication devices. The uplink OFDMA transmission is then received at the first communication device. The uplink OFDMA transmission includes respective beamforming training feedback packets generated based on the beamforming training packet by respective ones of the at least some of the multiple second communication devices. The respective beamforming training feedback
(Continued)

packets are simultaneously transmitted by the at least some of the multiple second communication devices.

16 Claims, 7 Drawing Sheets

Related U.S. Application Data (60) Provisional application No. 62/255,822, filed on Nov. 16, 2015, provisional application No. 62/244,283, filed on Oct. 21, 2015, provisional application No. 62/204,164, filed on Aug. 12, 2015, provisional application No. 62/112,894, filed on Feb. 6, 2015, provisional application No. 62/112,528, filed on Feb. 5, 2015, provisional application No. 62/088,257, filed on Dec. 5, 2014, provisional application No. 62/156,069, filed on May 1, 2015.

(51) Int. Cl.
*H04L 12/18* (2006.01)
*H04W 72/04* (2009.01)
*H04L 27/26* (2006.01)
*H04W 4/06* (2009.01)
*H04W 84/12* (2009.01)
*H04W 16/28* (2009.01)

(52) U.S. Cl.
CPC ........ *H04L 5/0057* (2013.01); *H04L 12/1886* (2013.01); *H04L 27/2602* (2013.01); *H04W 4/06* (2013.01); *H04W 16/28* (2013.01); *H04W 72/0413* (2013.01); *H04W 84/12* (2013.01); *H04L 5/0007* (2013.01); *H04L 5/0037* (2013.01)

(58) Field of Classification Search
CPC ........... H04L 12/1886; H04L 27/2602; H04W 72/005; H04W 72/0413; H04W 16/28; H04W 4/06; H04W 84/12
See application file for complete search history.

(56) References Cited

U.S. PATENT DOCUMENTS

| | | |
|---|---|---|
| 8,155,138 B2 | 4/2012 | van Nee |
| 8,270,909 B2 | 9/2012 | Zhang et al. |
| 8,289,869 B2 | 10/2012 | Sawai |
| 8,526,351 B2 | 9/2013 | Fischer et al. |
| 8,619,907 B2 | 12/2013 | Mujtaba et al. |
| 8,724,720 B2 | 5/2014 | Srinivasa et al. |
| 9,166,660 B2 | 10/2015 | Chu et al. |
| 9,197,298 B2 | 11/2015 | Kim et al. |
| 9,351,297 B2 | 5/2016 | Aboul-Magd et al. |
| 2006/0285483 A1 | 12/2006 | Khan |
| 2007/0298742 A1 | 12/2007 | Ketchum et al. |
| 2009/0196163 A1 | 8/2009 | Du |
| 2009/0225697 A1 | 9/2009 | Solomon |
| 2011/0002219 A1 | 1/2011 | Kim et al. |
| 2011/0128947 A1 | 6/2011 | Liu et al. |
| 2011/0199946 A1 | 8/2011 | Breit et al. |
| 2011/0222472 A1 | 9/2011 | Breit et al. |
| 2011/0243262 A1 | 10/2011 | Ratasuk et al. |
| 2011/0261708 A1* | 10/2011 | Grandhi ................. H04W 4/06 370/252 |
| 2012/0026909 A1 | 2/2012 | Seok |
| 2012/0033592 A1 | 2/2012 | Kim et al. |
| 2012/0033614 A1 | 2/2012 | Sampath et al. |
| 2012/0039196 A1 | 2/2012 | Zhang |
| 2012/0051246 A1 | 3/2012 | Zhang et al. |
| 2012/0051287 A1 | 3/2012 | Merlin et al. |
| 2012/0176921 A1 | 7/2012 | Abraham et al. |
| 2012/0177018 A1 | 7/2012 | Abraham et al. |
| 2012/0218981 A1 | 8/2012 | Lee et al. |
| 2012/0250618 A1 | 10/2012 | Abraham et al. |
| 2012/0328034 A1 | 12/2012 | Nabar et al. |
| 2013/0058239 A1 | 3/2013 | Wang et al. |
| 2013/0094488 A1 | 4/2013 | Choi et al. |
| 2013/0223427 A1* | 8/2013 | Sohn, III .............. H04W 74/06 370/338 |
| 2013/0229996 A1* | 9/2013 | Wang ................ H04W 72/0413 370/329 |
| 2013/0286959 A1 | 10/2013 | Lou et al. |
| 2014/0044069 A1 | 2/2014 | Bao et al. |
| 2014/0160964 A1 | 6/2014 | Trainin |
| 2014/0192914 A1 | 7/2014 | Liu et al. |
| 2014/0254351 A1 | 9/2014 | Newman et al. |
| 2014/0294019 A1 | 10/2014 | Quan et al. |
| 2014/0307612 A1 | 10/2014 | Vermani et al. |
| 2015/0043781 A1 | 2/2015 | Fukagawa |
| 2015/0124689 A1 | 5/2015 | Merlin et al. |
| 2015/0131517 A1 | 5/2015 | Chu et al. |
| 2015/0139091 A1 | 5/2015 | Azizi et al. |
| 2015/0222346 A1 | 8/2015 | Garrett et al. |
| 2015/0236770 A1 | 8/2015 | Garrett et al. |
| 2015/0319747 A1 | 11/2015 | Chu et al. |
| 2015/0319782 A1 | 11/2015 | Chu et al. |
| 2016/0014804 A1 | 1/2016 | Merlin et al. |
| 2016/0037330 A1 | 2/2016 | Ponnuswamy |
| 2016/0072564 A1 | 3/2016 | Li et al. |
| 2016/0073387 A1 | 3/2016 | Yang et al. |
| 2016/0081075 A1 | 3/2016 | Kim et al. |
| 2016/0100396 A1 | 4/2016 | Seok |
| 2016/0150505 A1 | 5/2016 | Hedayat |
| 2016/0165574 A1 | 6/2016 | Chu et al. |
| 2016/0165589 A1 | 6/2016 | Chu et al. |
| 2016/0295581 A1* | 10/2016 | Ghosh ............... H04W 72/0446 |
| 2016/0295629 A1 | 10/2016 | Gubeskys et al. |
| 2017/0141828 A1* | 5/2017 | Tosato ................. H04B 7/0663 |
| 2017/0289911 A1 | 10/2017 | Kim et al. |
| 2017/0338919 A1 | 11/2017 | Lim et al. |

OTHER PUBLICATIONS

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

(56) References Cited

OTHER PUBLICATIONS

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

Ansari et al., "Unified MIMO Pre-Coding Based on Givens Rotation, *The Institute of Electrical and Electronics Engineers*, doc. No. IEEE C802.16e-04/516r2," pp. 1-13, (Jan. 11, 2005).

Hiertz et al., "The IEEE 802.11 Universe," IEEE Communications Magazine, pp. 62-70, (Jan. 2010).

Love et al., "An Overview of Limited Feedback in Wireless Communication Systems," IEEE J. on Selected Areas in Communications, vol. 26, No. 8, pp. 1341-1365 (Oct. 2008).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

Zhang et al., "Beamforming Feedback for Single Stream," *The Institute of Electrical and Electronics Engineers*, doc. No. IEEE 802.11-12/1312r0, pp. 1-22 (Nov. 12, 2012).

International Search Report and Written Opinion for Application No. PCT/US2015/064307, dated Mar. 31, 2016 (13 pages).

Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

Van Nee et al. "The 802.11 n MIMO-OFDM Standard for Wireless LAN and Beyond," Wireless Personal Communications, vol. 37, pp. 445-453 (Jun. 2006).

Chun et al., "Legacy Support on HEW frame structure," doc: IEEE 11-13/1057r0, *The Institute of Electrical and Electronics Engineers, Inc.*, pp. 1-8 (Sep. 2013).

IEEE Std 802.16™-2012 (Revision of IEEE Std. 802.16/2009), IEEE Standard for Air Interface for Broadband Wireless Access Systems: Part 1—Beginning through Section 7, IEEE Computer Society and the IEEE Microwave Theory and Techniques Society, *The Institute of Electrical and Electronics Engineers, Inc.*, 2558 pages (Aug. 17, 2012).

International Search Report and Written Opinion in International Application No. PCT/US2016/030426, dated Nov. 7, 2016 (11 pages).

International Preliminary Report on Patentability in International Patent Application No. PCT/US2015/064307, dated Jun. 15, 2017 (10 pages).

Office Action in U.S. Appl. No. 14/961,635, dated May 19, 2017 (38 pages).

International Preliminary Report on Patentability in International Patent Application No. PCT/US2016/030426, dated Nov. 7, 2017 (8 pages).

Office Action in U.S. Appl. No. 14/961,635, dated Nov. 17, 2017 (28 pages).

Office Action in U.S. Appl. No. 14/961,380, dated Jul. 27, 2017 (53 pages).

Chen, "Home Network Basis: Transmission Environments and Wired/Wireless Protocols," Prentice Hall, pp. 1-26 (Jul. 2006).

Seok et al., "HEW PPDU Format for Supporting MIMO-OFDMA," IEEE 802.11-14/1210r0, 16 pages, (Sep. 14, 2014).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

\* cited by examiner

BEAMFORMING TRAINING IN ORTHOGONAL FREQUENCY DIVISION MULTIPLE ACCESS (OFDMA) COMMUNICATION SYSTEMS

CROSS-REFERENCE TO RELATED APPLICATION

The present application is a continuation-in-part of U.S. patent application Ser. No. 14/961,380, entitled "Trigger Frame Format for Orthogonal Frequency Division Multiple Access (OFDMA) communication," filed on Dec. 7, 2015, which claims the benefit of U.S. Provisional Patent Application Nos. 62/088,257, entitled "SYNC Design," filed on Dec. 5, 2014; 62/112,528, entitled "SYNC Design," filed on Feb. 5, 2015; 62/112,894, entitled "SYNC Design," filed on Feb. 6, 2015; No. 62/204,164, entitled "SYNC (Trigger Frame) Design," filed on Aug. 12, 2015; 62/244,283, entitled "OFDMA Beamforming Feedback," filed on Oct. 21, 2015; and 62/255,822, entitled "DL OFDMA with Broadcast RU," filed on Nov. 16, 2015. The present application also claims the benefit of U.S. Provisional Patent Application No. 62/156,069, entitled "Beamforming Feedback per OFDMA," filed on May 1, 2015. All of the applications referenced above are hereby incorporated by reference herein in their entireties.

Additionally, the present application is related to U.S. patent application Ser. No. 14/961,635, filed on Dec. 7, 2015, entitled "Trigger Frame Format for Orthogonal Frequency Division Multiple Access (OFDMA) communication," which is incorporated by reference herein in its entirety.

FIELD OF THE DISCLOSURE

The present disclosure relates generally to communication networks and, more particularly, to wireless local area networks that utilize orthogonal frequency division multiplexing (OFDM).

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

These WLANs operate in either a unicast mode or a multicast mode. In the unicast mode, the AP transmits information to one client station at a time. In the multicast mode, the same information is concurrently transmitted to a group of client stations.

SUMMARY

In an embodiment, a method for beamforming training in a wireless communication network includes transmitting, from a first communication device, a beamforming training packet to multiple second communication devices. The method also includes generating, at the first communication device, a trigger frame to trigger an uplink orthogonal frequency division multiple access (OFDMA) transmission of beamforming training feedback from at least some of the multiple second communication devices. The method further includes transmitting, with the first communication device and after transmission of the beamforming training packet by the first communication device, the trigger frame to the at least some of the multiple communication devices. The method additionally includes receiving, at the first communication device, the uplink OFDMA transmission, wherein the uplink OFDMA transmission includes respective beamforming training feedback packets generated based on the beamforming training packet by respective ones of the at least some of the multiple second communication devices, and wherein the respective beamforming training feedback packets are simultaneously transmitted by the at least some of the multiple second communication devices.

In another embodiment, an apparatus comprises a network interface device having one or more integrated circuits configured to transmit a beamforming training packet to multiple communication devices. The one or more integrated circuits are also configured to generate a trigger frame to trigger an uplink orthogonal frequency division multiple access (OFDMA) transmission of beamforming training feedback from at least some of the multiple communication devices. The one or more integrated circuits are further configured to, after transmission of the beamforming training packet, transmit the trigger frame to the at least some of the multiple communication devices. The one or more integrated circuits are additionally configured to receive the uplink OFDMA transmission, wherein the uplink OFDMA transmission includes respective beamforming training feedback packets generated based on the beamforming training packet by respective ones of the at least some of the multiple communication devices, and wherein the respective beamforming training feedback packets are simultaneously transmitted by the at least some of the multiple communication devices.

DETAILED DESCRIPTION

In embodiments described below, a wireless network device such as an access point (AP) of a wireless local area network (WLAN) simultaneously transmits data to multiple client stations and/or receives data simultaneously transmitted by multiple client stations. In some embodiments, the AP transmits data for the multiple clients in different orthogonal frequency division multiplexing (OFDM) sub-channels of an orthogonal frequency division multiple access (OFDMA) transmission. Similarly, multiple client stations simultaneously transmit data to the AP, in particular, each client station transmits data in a different OFDM sub-channel of an OFDMA transmission, in an embodiment. The AP is configured to beamform or steer transmissions to client stations, using channel information obtained from the client stations, in some embodiments. For example, according to an embodiment, the AP implements an explicit beamforming technique in which the AP transmits a beamforming training packet, or a sounding packet, that allows each of the multiple client stations to determine or estimate characteristics of the channel (channel information) between the AP and the client station. In an embodiment, the AP also transmits a trigger frame to trigger multiple client stations to simultaneously (e.g., in respective frequency portions) transmit feedback that includes channel information, or steering information (e.g., a steering matrix) determined based on the channel information, to the AP. The AP transmits the trigger frame after transmitting the beamforming training packet, in an embodiment. Transmitting the trigger frame after transmitting the beamforming training packet ensures that the client stations will have sufficient amount of time to obtain channel information and to generate feedback based on the channel information before the feedback is to be transmitted by the client stations to the AP, in an embodiment.

The AP is configured to operate with client stations according to at least a first communication protocol. The first communication protocol is sometimes referred to herein as "high efficiency," "high efficiency WiFi," "high efficiency WLAN," "HE," "HEW," or 802.11ax communication protocol. The first communication protocol supports OFDMA communication between the AP and the client stations. In some embodiments, different client stations in the vicinity of the AP are configured to operate according to one or more other communication protocols that define operation in the same frequency band as the HE communication protocol but with generally lower data throughputs. The lower data throughput communication protocols (e.g., IEEE 802.11a, IEEE 802.11n, and/or IEEE 802.11ac) are collectively referred herein as "legacy" communication protocols. The legacy communication protocols do not support OFDMA communication, in an embodiment.

Figure 1:
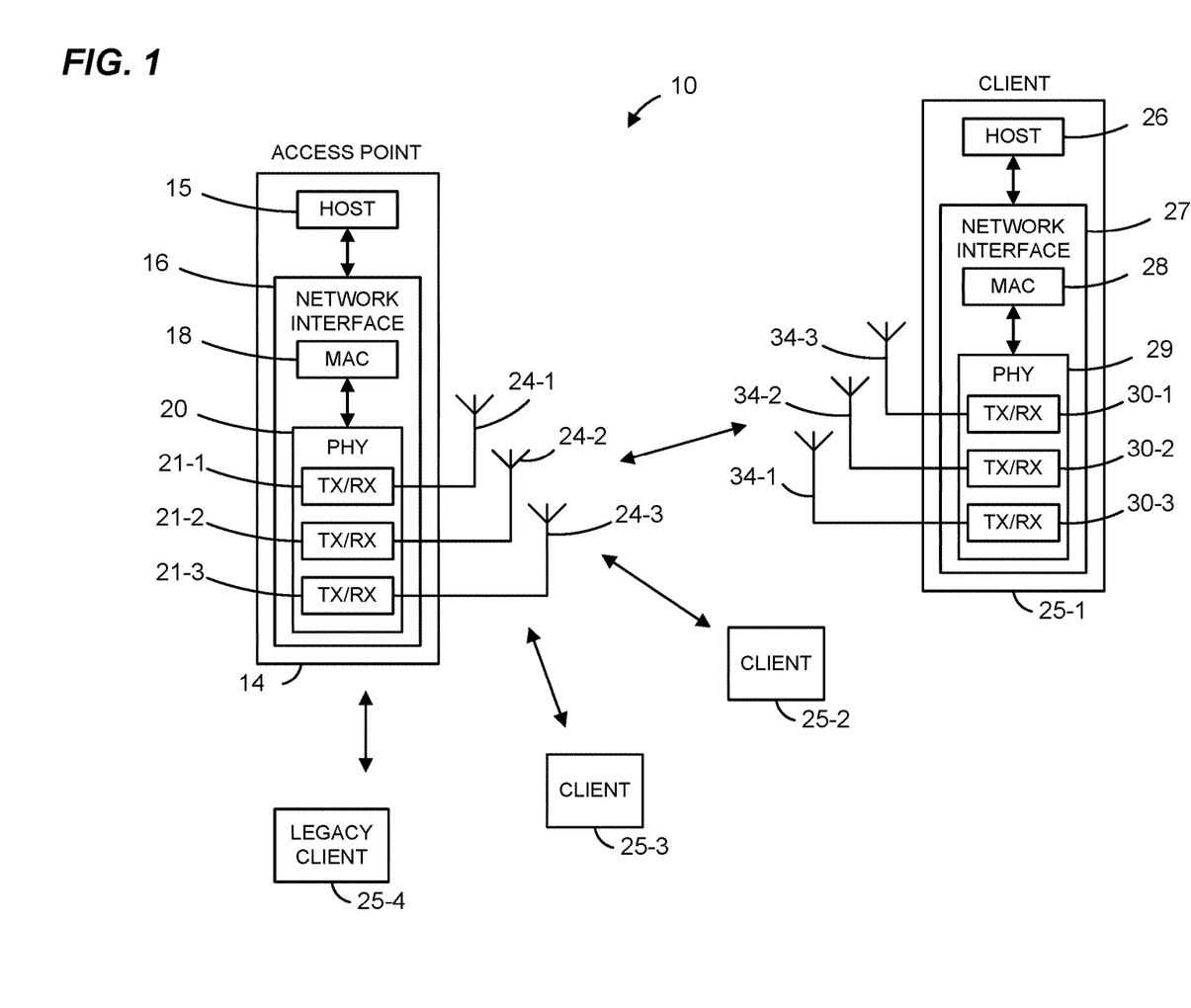
FIG. 1 is a block diagram of an example wireless local area network (WLAN), according to an embodiment.

FIG. 1 is a block diagram of an example wireless local area network (WLAN) 10, according to an embodiment. An AP 14 includes a host processor 15 coupled to a network interface 16. In an embodiment, the network interface 16 includes one or more integrate circuits (ICs) configured to operate as discussed below. The network interface 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

In various embodiments, the MAC processor 18 and the PHY processor 20 are configured to operate according to a first communication protocol (e.g., a High Efficiency, HE, or 802.11ax communication protocol). In some embodiments, the MAC processor 18 and the PHY processor 20 are also configured to operate according to a second communication protocol (e.g., according to the IEEE 802.11ac Standard). In yet another embodiment, the MAC processor 18 and the PHY processor 20 are additionally configured to operate according to the second communication protocol, a third communication protocol, and/or a fourth communication protocol (e.g., according to the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure that is the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processor 18 and the PHY processor 20 of the AP 14 are configured to generate data units conforming to the first communication protocol and having formats described herein. In an embodiment, the MAC processor 18 is configured to implement MAC layer functions, including MAC layer functions of the first communication protocol. In an embodiment, the PHY processor 20 is configured to implement PHY functions, including PHY functions of the first communication protocol. For example, in an embodiment, the MAC processor 18 is configured to generate MAC layer data units such as MPDUs, MAC control frames, etc., and provide the MAC layer data units to the PHY processor 20. In an embodiment, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in an embodiment, the PHY processor 20 is configured to receive PHY data units that were received via the antennas 24, and extract MAC layer data units encapsulated within the PHY data units. In an embodiment, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the first communication protocol and having formats described hereinafter and to determine that such data units conform to the first communication protocol, according to various embodiments.

In various embodiments, the MAC processor 28 and the PHY processor 29 of the client device 25-1 are configured to generate data units conforming to the first communication protocol and having formats described herein. In an embodiment, the MAC processor 28 is configured to implement MAC layer functions, including MAC layer functions of the first communication protocol. In an embodiment, the PHY processor 29 is configured to implement PHY functions, including PHY functions of the first communication protocol. For example, in an embodiment, the MAC processor 28 is configured to generate MAC layer data units such as MPDUs, MAC control frames, etc., and provide the MAC layer data units to the PHY processor 29. In an embodiment, the PHY processor 29 is configured to receive MAC layer data units from the MAC processor 28 and encapsulate the MAC layer data units to generate PHY data units such as PPDUs for transmission via the antennas 34. Similarly, in an embodiment, the PHY processor 29 is configured to receive PHY data units that were received via the antennas 34, and extract MAC layer data units encapsulated within the PHY data units. In an embodiment, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. The MAC processor 28 and the PHY processor 29 of the client device 25-1 are configured to process received data units conforming to the first communication protocol and having formats described hereinafter and to determine that such data units conform to the first communication protocol, according to various embodiments.

Figure 2:
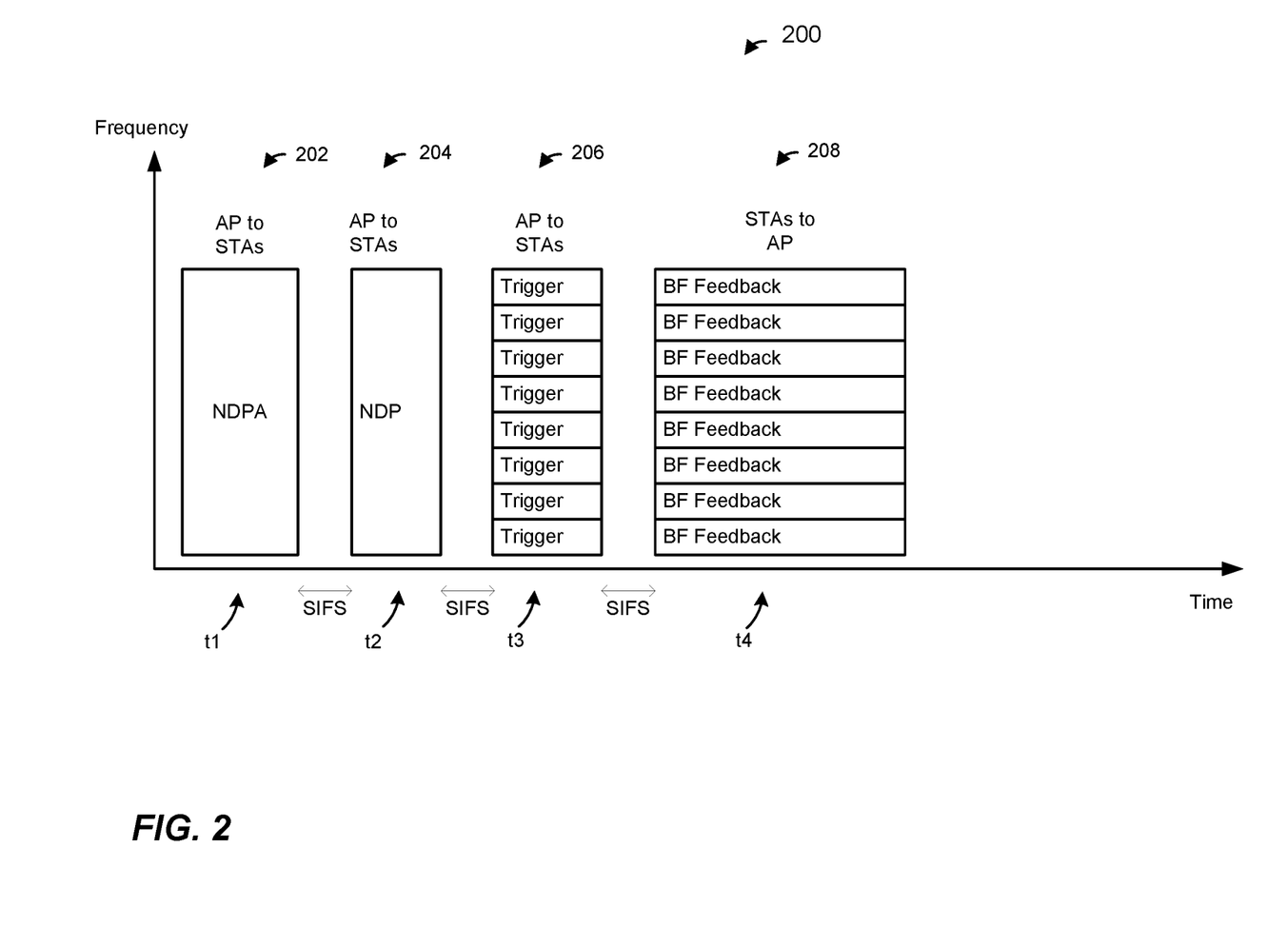
FIG. 2 is a diagram of an example transmission sequence in a WLAN, according to an embodiment.

FIG. 2 is a diagram of an example transmission sequence 200 in a WLAN, such as the WLAN 10 of FIG. 1, according to an embodiment, in which an AP, such as the AP 14, performs beamforming training with multiple client stations, such as multiple ones of the client stations 25. The AP 14 transmits an announcement frame 202 to multiple client stations 25. The announcement frame 202 is a downlink (DL) frame because the announcement frame 204 is transmitted in the downlink direction from the AP 14 to the client stations 25, in an embodiment. In an embodiment, the announcement frame 202 identifies client stations 25 that are to participate in the beamforming training. For example, the announcement frame 204 includes a respective identifier, such as an association identifier (AID) or a partial AID (PAID), associated with each client station 25 that is an intended participant of the beamforming training, in an embodiment. In an embodiment, the announcement frame 202 is a null data packet announcement (NDPA) frame. In an embodiment, the announcement frame 202 is a broadcast control frame that occupies the entire bandwidth of the communication channel in which the beamforming training is being performed. Thus, for example, in an embodiment in which the beamforming training is being performed in an 80 MHz-wide communication channel, the announcement frame 202 occupies an 80 MHz bandwidth. As another example, in an embodiment in which the beamforming training is being performed in a 40 MHz-wide communication channel, the announcement frame 202 occupies a 40 MHz bandwidth. In another embodiment, in which the beamforming training is being performed in a communication channel of another suitable width, the announcement frame 202 occupies a corresponding bandwidth of the other suitable width.

After transmitting the announcement frame 202, the AP 14 transmits a beamforming training packet 204, such as a null data packet (NDP), to sound the communication channel. The beamforming training packet 204 is a DL packet, in an embodiment. The beamforming training packet 204 occupies the bandwidth of the communication channel in which the beamforming training is being performed (i.e., the communication channel being sounded), in an embodiment. The beamforming training packet 204 includes one or more training signals, such as one or more training fields (e.g., long training fields (LTFs)), that allow each of the multiple client stations 25 to estimate the channel between the AP 14 and the client station 25, in an embodiment. In an embodiment, the AP 14 initiates transmission of the beamforming training packet 204 upon expiration of a predetermined time interval after the end of transmission of the announcement frame 202. In an embodiment, the predetermined time interval is a time interval corresponding to a short interframe space (SIFS) defined by the first communication protocol (e.g., IEEE 802.11ax) and/or by a legacy communication protocol (e.g., the IEEE 802.11n/ac). In another embodiment, the predetermined time interval is a suitable time interval different from SIFS time interval. In another embodiment, the predetermined time interval is a suitable time interval different from a SIFS time interval.

After transmitting the beamforming training packet 204, the AP 14 transmits a trigger frame 206 to trigger transmission of beamforming feedback from at least some of the multiple client stations 25, which are participating in the beamforming training, to the AP 14. The trigger frame 206 is a DL frame, in an embodiment. In an embodiment, the AP 14 initiates transmission of the trigger frame 206 upon expiration of a predetermined time interval after the end of transmission of the beamforming training packet 204. In an embodiment, the predetermined time interval is a time interval corresponding to the SIFS time interval defined by the first communication protocol (e.g., IEEE 802.11ax) and/or by a legacy communication protocol (e.g., the IEEE 802.11n/ac). In another embodiment, the predetermined time interval is a suitable time interval different from a SIFS time interval. In an embodiment, the trigger frame 206 triggers the at least some of the multiple client stations 25 to transmit respective feedback packets simultaneously, using different frequency portions of an uplink OFDMA transmission from the at least some of the client stations 25 to the AP 14. The trigger frame 206 includes one or more fields for specifying one or more of i) a trigger type (e.g., that the trigger frame 206 is a beamforming trigger, ii) one or more PHY parameters that are to be utilized for transmission of feedback, iv) resource unit allocations indicating which frequency portions correspond with which client stations, etc., according to various embodiments. The trigger frame 206 has a suitable format, such as a format described in U.S. patent application Ser. No. 14/961,380 and/or U.S. patent application Ser. No. 14/961,635, or another suitable format, according to various embodiments.

In response to receiving the trigger frame 206, the at least some of the multiple client stations 25 triggered by the trigger frame 206 transmit beamforming feedback (e.g., feedback packets) in an OFDMA transmission 208 to the AP 14. The OFDMA transmission 208 is an uplink (UL) transmission because OFDMA transmission 208 is transmitted in the uplink direction from the client stations 25 to the AP 14, in an embodiment. In an embodiment, each client station 25 initiates transmission of the feedback (e.g., a feedback packet) upon expiration of a predetermined time interval, such as, for example, a time interval corresponding to SIFS, after completion of reception of the trigger frame 206. Because, in the transmission sequence 200, the beamforming training packet 204 is transmitted by the AP 14 before the trigger frame 206 is transmitted by the AP 14, the client stations 25 have sufficient amount of time to perform channel estimation based on the beamforming training packet 204, and to generate the feedback based on the channel estimation, in an embodiment. Accordingly, transmission of the feedback packets by the client stations 25 as parts of the uplink OFDMA transmission 208 can begin upon expiration of a relatively short time interval after the end of reception of the trigger frame 204 by the client stations 25, such as the time interval corresponding to SIFS, in an embodiment.

Figure 3:
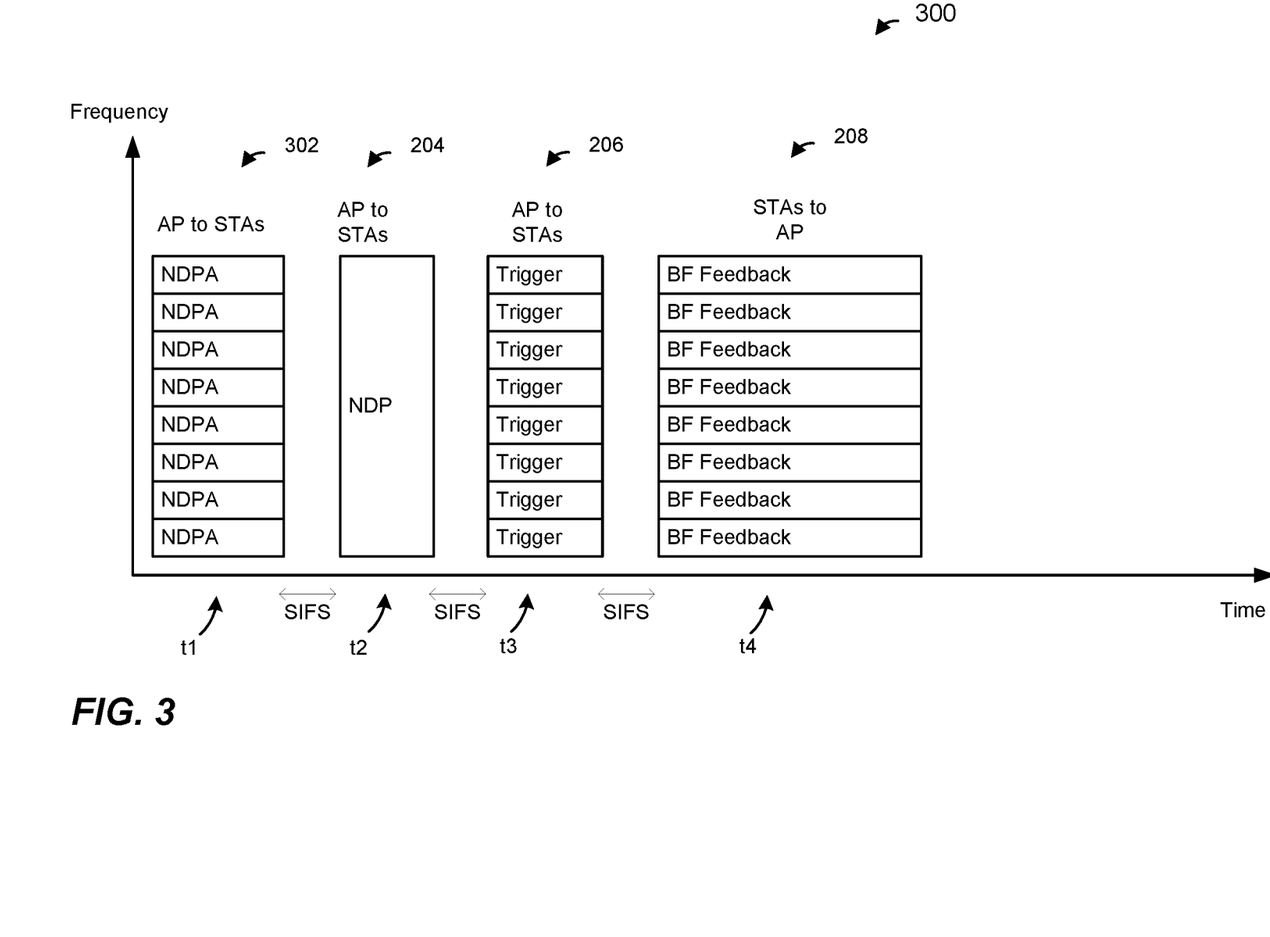
FIG. 3 is a diagram of an example transmission sequence in a WLAN, according to another embodiment.

FIG. 3 is a diagram of an example transmission sequence 300 in a WLAN, such as the WLAN 10 of FIG. 1, according to an embodiment, in which an AP, such as the AP 14, performs beamforming training with multiple client stations, such as multiple ones of the client stations 25. The transmission sequence 300 is similar to the transmission sequence 200 of FIG. 2 except that the announcement frame 202 in the transmission sequence 200 is replaced with an announcement frame 302. Unlike the announcement frame 202 which occupies an entire bandwidth of the channel in which the beamforming training is being performed, the announcement frame 302 is a duplicate frame that is duplicated in each of a plurality of subchannels of the channel in which the beamforming training is being performed. Thus, for example, in an embodiment in which the beamforming training is being performed in an 80 MHz-wide communication channel, the announcement frame 202 is duplicated in each of four 20 MHz-wide subchannels of the 80 MHz-wide communication channel, in an embodiment. As another example, in an embodiment in which the beamforming training is being performed in a 40 MHz-wide communication channel, the announcement frame 202 is duplicated in each of two 20 MHz-wide subchannels of the 40 MHz-wide communication channel, in an embodiment. The announcement frame 202 is duplicated in another suitable number of subchannels of the communication channel in which the beamforming training is being performed, in another embodiment.

In an embodiment, the announcement frame 302 has a format the same as or similar to a beamforming announcement frame defined by a legacy communication protocol, such as the IEEE 802-11n/ac Standard. In an embodiment, a legacy communication device is configured to receive, decode, and at least partially understand information included in the announcement frame 302. Such format of the announcement frame 302 allows one or more legacy client stations, such as the legacy client station 25-4, along with one or more non-legacy client stations, such as the client stations 25-1, 25-2, 15-3, to participate in the beamforming training, in an embodiment. In an embodiment, however, such format of the announcement frame 302 is used even when the plurality of client stations that are intended participants of the beamforming training being announced by the announcement frame does not include any legacy client stations.

Figure 4:
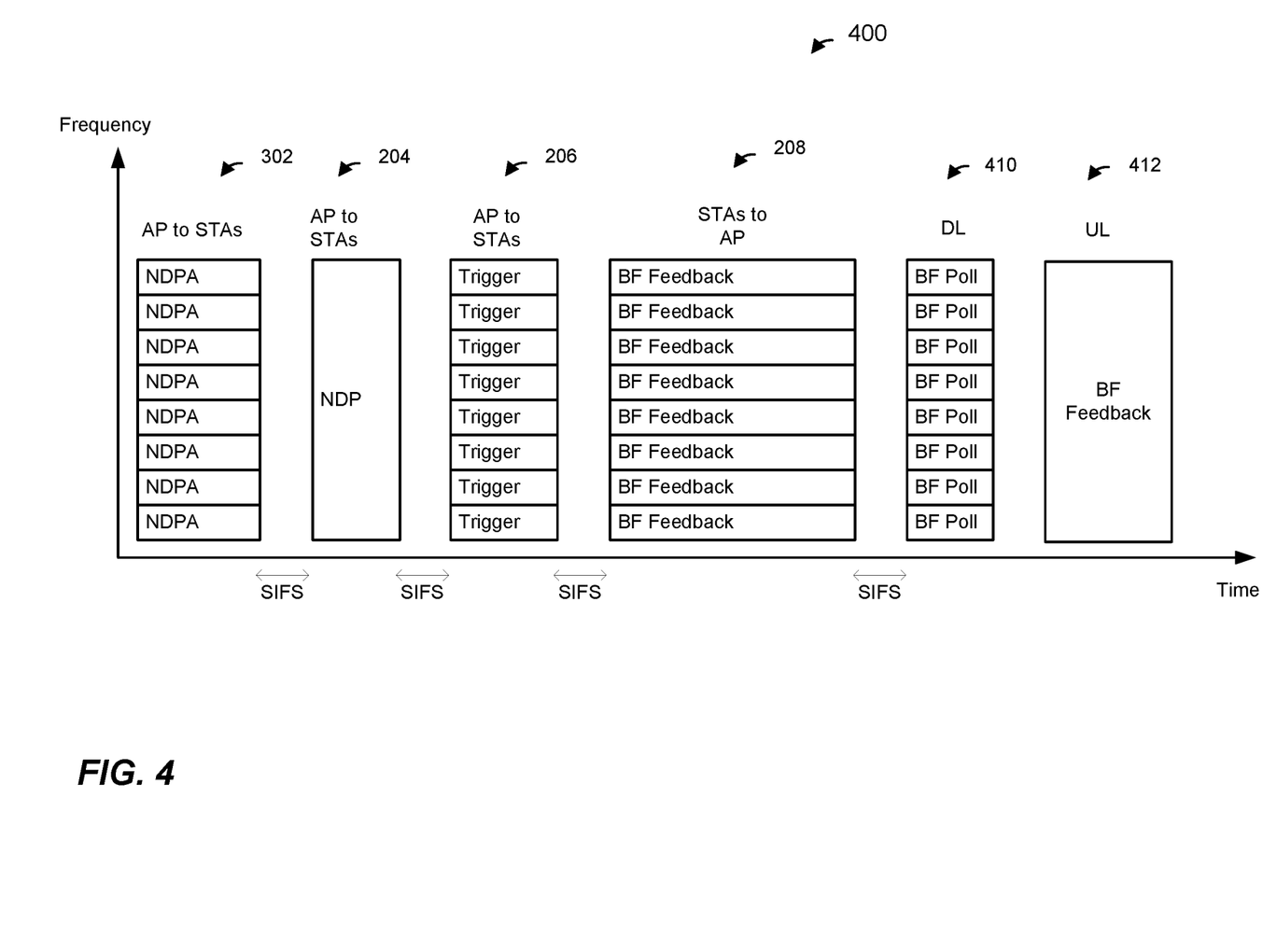
FIG. 4 is a diagram of an example transmission sequence in a WLAN, according to another embodiment.

FIG. 4 is a diagram of an example transmission sequence 400 in a WLAN, such as the WLAN 10 of FIG. 1, according to an embodiment, in which an AP, such as the AP 14, performs beamforming training with multiple client stations, such as multiple ones of the client stations 25. The transmission sequence 400 is similar to the transmission sequence 300 of FIG. 3, except that the transmission sequence 400 includes transmission of feedback by a legacy client station, such as the legacy client station 25-4, in an embodiment. For example, the multiple client stations 25 that are participating in the beamforming training include a legacy client station that is not configured to operate according to the first communication protocol, in an embodiment. The legacy client station is not configured for OFDMA communication, in an embodiment.

In an embodiment, in the scenario illustrated in FIG. 4, the announcement frame 302 identifies the legacy client station among the multiple client stations that are intended participants in the beamforming training being announced by the announcement frame 302. The legacy client station is able to receive and decode the announcement frame 302 and to determine, based on the announcement frame 302, that the legacy client station is to participate in the beamforming training being announced by the announcement frame 302, in an embodiment. The legacy client station then receives the beamforming training packet 204, transmitted by the AP 14 to the multiple of client stations 25 that include the legacy client station, and generates feedback based on the beamforming training packet 204, in an embodiment.

The trigger frame 206 triggers at least some of the non-legacy client stations to transmit feedback from at least some of non-legacy client stations 25 of the plurality of client stations 25 that are participating in the beamforming training announced by the announcement frame 302, in an embodiment. After receiving the uplink OFDMA transmission 208 that includes respective feedback packets from the at least some of the non-legacy client stations 25 triggered by the trigger frame 302, the AP 14 transmits a poll frame 410. The poll frame 410 is a duplicate frame that is duplicated in each of a plurality of subchannels of the communication channel in which the beamforming training is being performed, in an embodiment. In an embodiment, the poll frame 410 has a beamforming feedback poll frame format defined by the legacy communication protocol according to which the legacy client station is configured to operate, such the IEEE 802.11n/ac Standard. In an embodiment, the AP 14 initiates transmission of the poll frame 410 upon expiration of a predetermined time interval, such as for example a time interval corresponding to SIFS, after completion of reception of the OFDMA transmission 208.

In response to receiving the poll frame 410, the legacy client station transmits a feedback packet 412 to the AP 14. In an embodiment, if more than one client legacy station is participating in the beamforming training, the AP 14 transmits additional poll frames after receiving the BF feedback 412 from the legacy client station polled by the poll frame 410. Thus, for example, the transmission sequence 400 includes one or more additional frame exchanges 410, 412 via which the AP 14 obtains feedback from one or more additional In an embodiment, the one or more additional poll frames transmitted by the AP 14 trigger, one by one, trigger additional legacy client station(s) to transmit feedback packets to the AP 14 as defined by the by the legacy communication protocol according to which the legacy client stations are configured to operate, such the IEEE 802.11n/ac Standard.

Figure 5A:
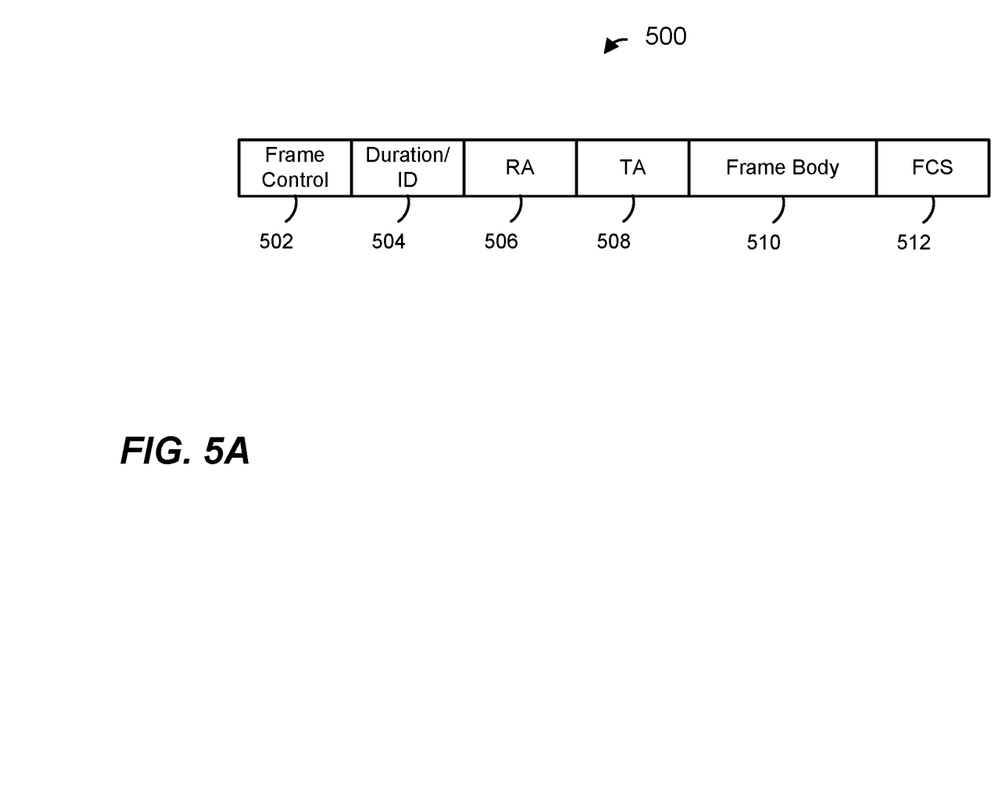
FIG. 5A is a diagram of an announcement frame, according to an embodiment.

FIG. 5A is a block diagram of an announcement frame 500, according to an embodiment. In an embodiment, the announcement frame 500 corresponds to the announcement frame 202 of FIG. 2 or the announcement frame 302 of FIGS. 3 and 4. The announcement frame 500 includes a plurality of fields, including a frame control field 502, a duration/ID field 504, a first address field (e.g., a receiver address (RA) field) 506, a second address field (e.g., a transmitter address (TA) field) 508, a frame body field 510 and a frame check field 512.

Figure 5B:
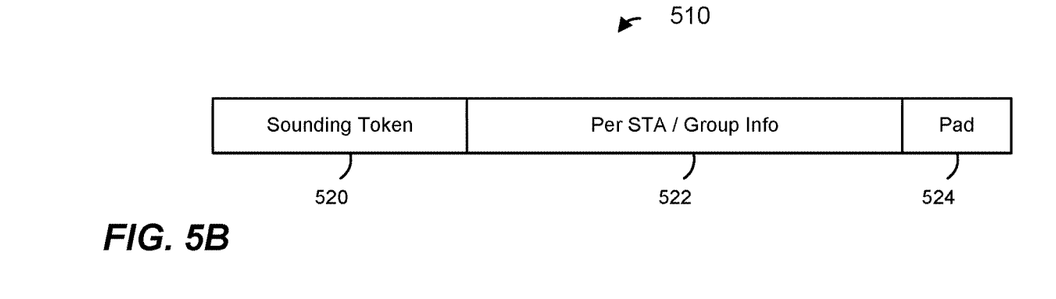
FIG. 5B is a diagram of a frame body of an announcement frame, according to an embodiment.

In an embodiment, the duration/ID field 504 includes an indication of a duration until the end of a transmission opportunity (TXOP) for the beamforming training initiated by the announcement frame 500. The first address field (RA field) 506 includes a broadcast MAC address to indicate that the announcement frame 500 is being broadcast to a plurality of client stations 25, in an embodiment. The second address field (TA field) 508 includes the address of the AP14, in an embodiment. In an embodiment, the frame body 510 includes identifies client station 25 that are to participate in the beamforming training procedure, and also indicates beamforming control information to the identified client stations 25. Referring to FIG. 5B, in an embodiment, the frame body 510 includes a sounding token field 520 and per-STA information fields 522. The frame body 510 also includes padding bits 524, in some embodiments and scenarios. In an embodiment, padding bits 524 include one or more bits to ensure that the frame body 510 includes a number of bits that is an integer multiple of an octet. In another embodiment, padding bits 524 include one or more bits to provide sufficient time for a receiving device (e.g., a client station) to generate the uplink transmission being triggered by the trigger frame 500. In some embodiments and/or scenarios, the frame body 510 omits the padding bits 524.

Figure 5C:
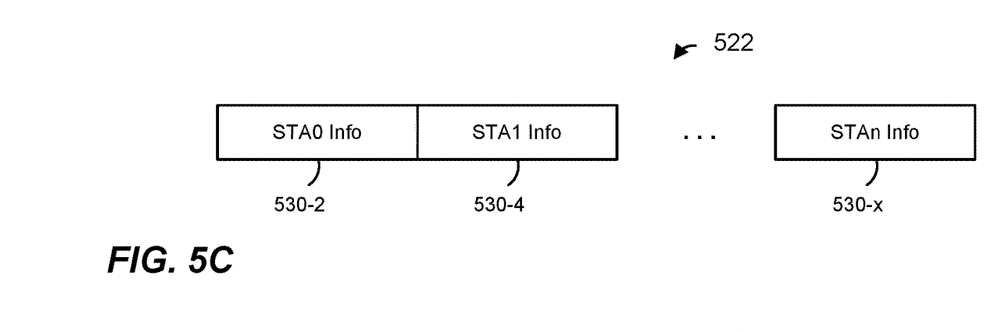
FIG. 5C is a diagram of per-station (per-STA) information fields of an announcement frame, according to an embodiment.
Figure 5D:
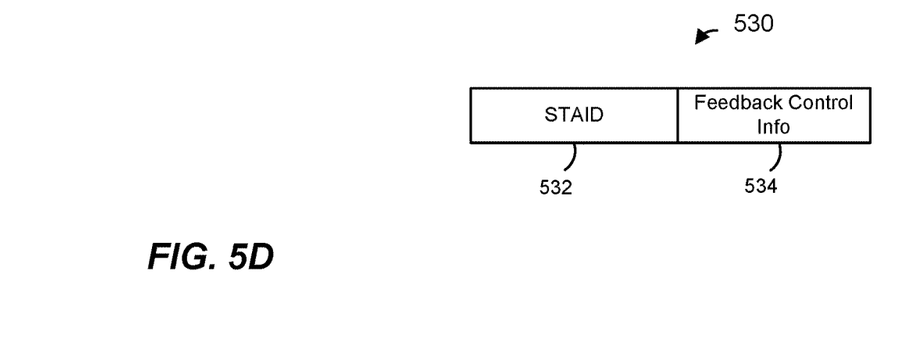
FIG. 5D is a diagram of a per-STA information field, according to an embodiment.

FIG. 5C is a diagram of the per-STA information fields 522, according to an embodiment. The per-STA information fields 522 includes a plurality of subfields 530, each subfield 530 corresponding to a particular client station or to a particular client station 25, in an embodiment. As illustrated in FIG. 5D, each per-STA information field 530 includes an STAID subfield 532 and a feedback control information subfield 534. In an embodiment, the STAID subfield 532 identifies a particular client station 25 that is an intended participant in the beamforming training procedure. In an embodiment, the STAID subfield 532 is the same as or similar to the STAID subfield 702-4 described above with respect to FIG. 7A. The feedback control information subfield 534 indicates feedback information such as a feedback type, a beamforming bandwidth (e.g., a bandwidth of the beamforming training packet that follows the announcement frame 500), an Nc index that indicates a number of columns in a feedback matrix to be provided by the corresponding client station 25 to the AP14, etc., in an embodiment.

In an embodiment in which a legacy client station is a participant in the beamforming training, such as the embodiment described above with reference to FIG. 4, the legacy client station is configured to automatically transmit feedback after reception of a beamforming training packet, such as the beamforming training packet 204, if the legacy client station is identified by the per-STA information subfield 530-2 corresponding to STA0. For example, the legacy communication protocol according to which the legacy client station is configured to operate specifies that the client station that is identified as STA0 in a beamforming announcement frame should automatically transmit its feedback upon expiration of a predetermined time interval (e.g., SIFS) after reception of a beamforming training packet that follows the beamforming announcement frame, in an embodiment. In an embodiment, the AP 14 is configured to suppress automatic transmission of feedback by the legacy client station to avoid collision of the feedback with the trigger frame 206. For example, the AP 14 is configured to set the per-STA information subfield 530-2 corresponding to STA0 to a reserved value (e.g., 0), or a value of an STAID that is not associated with any client station 25 in the WLAN 10, in an embodiment.

Figure 6:
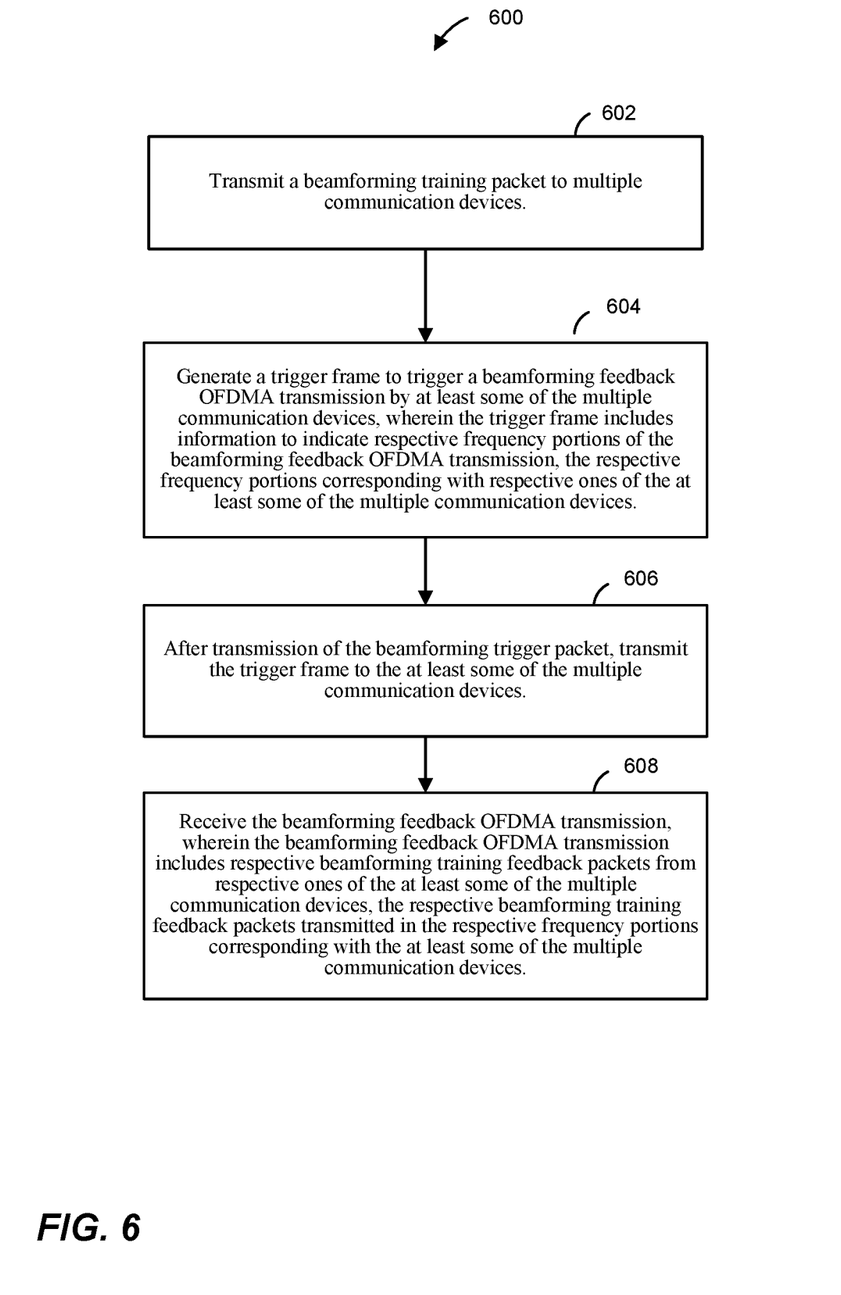
FIG. 6 is a flow diagram of an example method for beamforming training in a WLAN, according to an embodiment.

FIG. 6 is a flow diagram of an example method 600 for beamforming training in a wireless communication network, according to an embodiment. In some embodiments, the method 600 is implemented by the AP 14 (FIG. 1). For example, in some embodiments, the network interface device 16 (e.g., the PHY processor 20 and/or the MAC processor 18) is configured to implement the method 600. In other embodiments, another suitable network interface device is configured to implement the method 600.

At block 602, a beamforming training packet is transmitted to multiple communication devices. In an embodiment, the beamforming training packet 204 of FIGS. 2, 3, 4 is transmitted. In another embodiment, another suitable beamforming training packet is transmitted. In an embodiment, the beamforming training packet includes one or more training fields that allow the multiple communication devices to obtain measures of respective communication channels associated with the communication devices.

At block 604, a trigger frame is generated. In an embodiment, the trigger frame 206 of FIGS. 2, 3, 4, is generated. In another embodiment, another suitable trigger frame is generated. In an embodiment, the trigger frame is generated to trigger an uplink OFDMA transmission from at least some of the multiple communication devices. In an embodiment, the trigger frame includes information to indicate respective frequency portions of the uplink OFDMA transmission, the respective frequency portions corresponding with respective ones of the at least some of the multiple communication devices.

At block 606, after the beamforming training packet is transmitted at block 602, the trigger frame generated at block 606 is transmitted to the at least some of the multiple communication devices.

At block 608, the uplink OFDMA transmission is received. In an embodiment, the uplink OFDMA transmission includes respective beamforming training feedback packets from respective ones of the at least some of the multiple communication devices. In an embodiment, the respective beamforming training feedback packets are simultaneously transmitted by the at least some of the multiple communication devices. In an embodiment, the respective beamforming feedback packets are transmitted, by the at least some of the multiple communication device, in the respective frequency portions corresponding with the at least some of the multiple communication devices.

In an embodiment, each of the multiple communication devices receives the beamforming training packet transmitted at block 602, and generates beamforming feedback based on the received beamforming training packet. Each of the at least some of the multiple communication devices being triggered by the trigger frame transmitted at block 606 receives the trigger frame and determines, based on the received trigger frame, that the communication device is being triggered to transmit the feedback generated based on the beamforming training packet transmitted at block 602, in an embodiment. In response to receiving the trigger frame, each of the at least some of the multiple communication devices transmits the feedback generated based on the beamforming training packet transmitted at block 602, in an embodiment. In an embodiment, because the trigger frame is transmitted at block 606 after the beamforming training packet is transmitted at block 602, each of the at least some multiple communication devices that is to transmit the feedback in response to receiving the trigger frame at block 606 has sufficient amount of time to generate the feedback based on the beamforming training packet transmitted at block 602 and to transmit the feedback upon expiration of a relatively short time interval after receiving the trigger frame transmitted at block 606. For example, each of the at least some of the multiple communication devices transmits the feedback upon expiration of a time interval corresponding to SIFS after receiving the trigger frame, in an embodiment.

In an embodiment, a method for beamforming training in a wireless communication network includes transmitting, from a first communication device, a beamforming training packet to multiple second communication devices. The method also includes generating, at the first communication device, a trigger frame to trigger an uplink orthogonal frequency division multiple access (OFDMA) transmission of beamforming training feedback from at least some of the multiple second communication devices. The method further includes transmitting, with the first communication device and after transmission of the beamforming training packet by the first communication device, the trigger frame to the at least some of the multiple communication devices. The method additionally includes receiving, at the first communication device, the uplink OFDMA transmission, wherein the uplink OFDMA transmission includes respective beamforming training feedback packets generated based on the beamforming training packet by respective ones of the at least some of the multiple second communication devices, and wherein the respective beamforming training feedback packets are simultaneously transmitted by the at least some of the multiple second communication devices.

In other embodiments, the method includes any suitable combination of one or more of the following features.

Transmitting the trigger frame comprises transmitting the trigger frame upon expiration of a first predetermined time interval after transmission of the beamforming training packet.

The first predetermined time interval corresponds to a short inter-frame spacing (SIFS) time interval.

The trigger frame causes the second communication devices to transmit the respective beamforming training feedback packets upon expiration of a second predetermined time interval after reception of the trigger frame by the second communication devices.

The second predetermined time interval corresponds to a short inter-frame spacing (SIFS) time interval.

The trigger frame includes information to indicate respective frequency portions of the uplink OFDMA transmission, the respective frequency portions corresponding with respective ones of the at least some of the multiple second communication devices.

The respective beamforming training feedback packets simultaneously transmitted by the least some of the multiple second communication devices are transmitted in the respective frequency portions corresponding with the at least some of the multiple second communication devices.

The method further comprises, prior to transmitting the beamforming packet, transmitting, with the first communication device, an announcement frame to the multiple second communication devices, wherein the announcement frame identifies the multiple second communication devices.

The announcement frame occupies an entire bandwidth of the communication channel.

The announcement frame is duplicated in each of a plurality of subchannels of the communication channel.

The multiple second communication devices include a legacy communication device that is not configured for OFDMA communication.

The method further comprises, after receiving the uplink OFDMA transmission, transmitting a polling frame to trigger transmission of feedback from the legacy communication device.

The method further comprises including, in the announcement frame, an indication to suppress automatic feedback by the legacy second communication device.

In another embodiment, an apparatus comprises a network interface device having one or more integrated circuits configured to transmit a beamforming training packet to multiple communication devices. The one or more integrated circuits are also configured to generate a trigger frame to trigger an uplink orthogonal frequency division multiple access (OFDMA) transmission of beamforming training feedback from at least some of the multiple communication devices. The one or more integrated circuits are further configured to, after transmission of the beamforming training, transmit the trigger frame to the at least some of the multiple communication devices. The one or more integrated circuits are additionally configured to receive the uplink OFDMA transmission, wherein the uplink OFDMA transmission includes respective beamforming training feedback packets generated based on the beamforming training packet by respective ones of the at least some of the multiple communication devices, and wherein the respective beamforming training feedback packets are simultaneously transmitted by the at least some of the multiple communication devices.

In other embodiments, the apparatus includes any suitable combination of one or more of the following features.

The one or more integrated circuits are configured to transmit the trigger frame upon expiration of a first predetermined time interval after transmission of the beamforming training packet.

The first predetermined time interval corresponds to a short inter-frame spacing (SIFS) time interval.

The trigger frame causes the second communication devices to transmit the respective beamforming training feedback packets upon expiration of a second predetermined time interval after reception of the trigger frame by the multiple communication devices.

The second predetermined time interval corresponds to a short inter-frame spacing (SIFS) time interval.

The trigger frame includes information to indicate respective frequency portions of the uplink OFDMA transmission, the respective frequency portions corresponding with respective ones of the at least some of the multiple communication devices.

The respective beamforming training feedback packets simultaneously transmitted by the least some of the multiple communication devices are transmitted in the respective frequency portions corresponding with the at least some of the multiple communication devices.

The one or more integrated circuits are further configured to, prior to transmitting the beamforming packet, transmit an announcement frame to the multiple communication devices, wherein the announcement frame identifies the multiple communication devices.

The announcement frame occupies an entire bandwidth of the communication channel.

The announcement frame is duplicated in each of a plurality of subchannels of the communication channel.

The multiple communication devices include a legacy communication device that is not configured for OFDMA communication, and wherein the method further comprises, after receiving the uplink OFDMA transmission, transmitting a polling frame to trigger transmission of feedback from the legacy communication device.

The one or more integrated circuits are further configured to include in the announcement frame an indication to suppress automatic feedback by the legacy second communication device.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for beamforming training in a wireless communication network, the method comprising:

transmitting, from a first communication device, a transmission to multiple second communication devices, wherein the transmission indicates that the first communication device will subsequently transmit a null data packet (NDP), wherein the multiple second communication devices include i) a plurality of non-legacy second communication devices and ii) a legacy second communication device, wherein the transmission includes an NDP announcement frame that includes multiple per-station information fields for indicating respective second communication devices that are to provide feedback in response to the NDP, wherein the multiple per-station information fields are arranged in an order, wherein a first-occurring per-station information field in the order is set to indicate an address that has not been allocated to any communication devices in the wireless communication network, and wherein another per-station information field after the first-occurring per-station information field is set to indicate an address of the legacy second communication device;

transmitting, from the first communication device, the NDP;

generating, at the first communication device, a trigger frame to trigger an uplink orthogonal frequency division multiple access (OFDMA) transmission of beamforming training feedback from at least some non-legacy second communication devices among the plurality of non-legacy second communication devices;

transmitting, with the first communication device and after transmission of the NDP by the first communication device, the trigger frame to the at least some non-legacy second communication devices among the plurality of non-legacy second communication devices;

receiving, at the first communication device, the uplink OFDMA transmission, wherein the uplink OFDMA transmission includes respective beamforming training feedback packets generated based on the NDP by respective ones of the at least some non-legacy second communication devices among the plurality of non-legacy second communication devices, and wherein the respective beamforming training feedback packets are simultaneously transmitted by the at least some non-legacy second communication devices among the plurality of non-legacy second communication devices; and after receiving the uplink OFDMA transmission, transmitting a polling frame to trigger transmission of beamforming training feedback, corresponding to the NDP, from the legacy second communication device.

2. The method of claim 1, wherein transmitting the trigger frame comprises transmitting the trigger frame upon expiration of a first predetermined time interval after transmission of the NDP.

3. The method of claim 2, wherein the first predetermined time interval corresponds to a short inter-frame spacing (SIFS) time interval.

4. The method of claim 1, wherein the trigger frame causes the at least some non-legacy second communication devices among the plurality of non-legacy second communication devices to transmit the respective beamforming training feedback packets upon expiration of a second predetermined time interval after reception of the trigger frame by the at least some non-legacy second communication devices among the plurality of non-legacy second communication devices.

5. The method of claim 4, wherein the second predetermined time interval corresponds to a short inter-frame spacing (SIFS) time interval.

6. The method of claim 1, wherein
the trigger frame includes subchannel allocation information corresponding to the at least some non-legacy second communication devices among the plurality of non-legacy second communication devices, and
the respective beamforming training feedback packets simultaneously transmitted by the at least some non-legacy second communication devices among the plurality of non-legacy second communication devices are transmitted in respective frequency portions in accordance with the subchannel allocation information.

7. The method of claim 1, wherein the NDP announcement frame occupies an entire bandwidth of a communication channel.

8. The method of claim 1, wherein the NDP announcement frame is duplicated in each of a plurality of subchannels of a communication channel.

9. An apparatus, comprising:
a network interface device implemented on one or more integrated circuits;
wherein the one or more integrated circuits are configured to:
transmit a transmission to multiple communication devices, wherein the transmission indicates that the network interface device will subsequently transmit a null data packet (NDP), wherein the multiple communication devices include i) a plurality of non-legacy communication devices and ii) a legacy communication device, wherein the transmission includes an NDP announcement frame that includes multiple per-station information fields for indicating respective second communication devices that are to provide feedback in response to the NDP, wherein the multiple per-station information fields are arranged in an order, wherein a first-occurring per-station information field in the order is set to indicate an address that has not been allocated to any communication devices in the wireless communication network, and wherein another per-station information field after the first-occurring per-station information field is set to indicate an address of the legacy communication device
transmit the NDP;
generate a trigger frame to trigger an uplink orthogonal frequency division multiple access (OFDMA) transmission of beamforming training feedback from at least some non-legacy communication devices among the plurality of non-legacy communication devices;
after transmission of the NDP, transmit the trigger frame to the at least some non-legacy communication devices among the plurality of non-legacy communication devices;
receive the uplink OFDMA transmission, wherein the uplink OFDMA transmission includes respective beamforming training feedback packets generated based on the NDP by respective ones of the at least some non-legacy communication devices among the plurality of non-legacy communication devices, and wherein the respective beamforming training feedback packets are simultaneously transmitted by the at least some non-legacy communication devices among the plurality of non-legacy communication devices; and
after receiving the uplink OFDMA transmission, transmit a polling frame to trigger transmission of beamforming training feedback, corresponding to the NDP, from the legacy communication device.

10. The apparatus of claim 9, wherein the one or more integrated circuits are configured to transmit the trigger frame upon expiration of a first predetermined time interval after transmission of the NDP.

11. The apparatus of claim 10, wherein the first predetermined time interval corresponds to a short inter-frame spacing (SIFS) time interval.

12. The apparatus of claim 9, wherein the trigger frame causes the at least some non-legacy communication devices among the plurality of non-legacy communication devices to transmit the respective beamforming training feedback packets upon expiration of a second predetermined time interval after reception of the trigger frame by the at least some non-legacy communication devices among the plurality of non-legacy communication devices.

13. The apparatus of claim 12, wherein the second predetermined time interval corresponds to a short inter-frame spacing (SIFS) time interval.

14. The apparatus of claim 9, wherein
the trigger frame includes subchannel allocation information corresponding to the at least some non-legacy communication devices among the plurality of non-legacy communication devices, and
the respective beamforming training feedback packets simultaneously transmitted by the at least some of the plurality of non-legacy communication devices are transmitted in respective frequency portions in accordance with the subchannel allocation information.

15. The apparatus of claim 9, wherein the NDP announcement frame occupies an entire bandwidth of a communication channel.

16. The apparatus of claim 9, wherein the NDP announcement frame is duplicated in each of a plurality of subchannels of a communication channel.

* * * * *